H. EDNER.
STRAINER FOR MILK CANS.
APPLICATION FILED NOV. 27, 1908.
921,525.
Patented May 11, 1909.
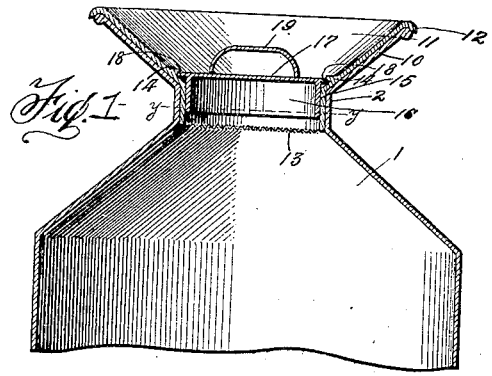
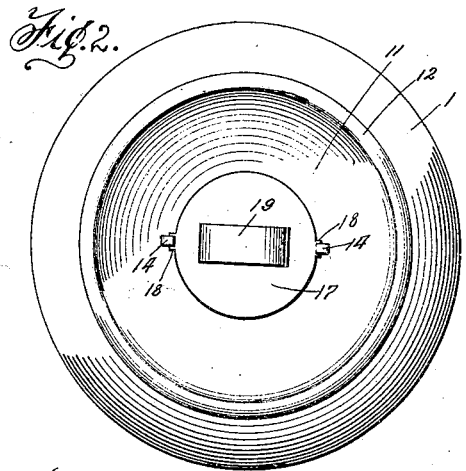
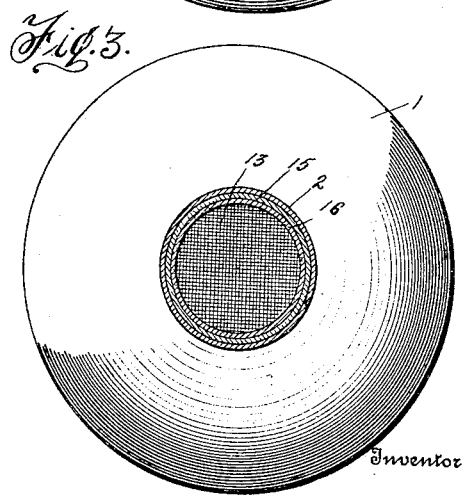

UNITED STATES PATENT OFFICE.

HOMER EDNER, OF DUBOIS, PENNSYLVANIA.

STRAINER FOR MILK-CANS.

No. 921,525.   Specification of Letters Patent.   Patented May 11, 1909.

Application filed November 27, 1908. Serial No. 464,573.

To all whom it may concern:

Be it known that I, HOMER EDNER, a citizen of the United States of America, residing at Dubois, in the county of Clearfield and State of Pennsylvania, have invented certain new and useful Improvements in Strainers for Milk-Cans, of which the following is a specification, reference being had therein to the accompanying drawing.

This invention relates to strainers for milk cans, and the primary object of my invention is to provide a strainer that can be used as a fixture in a milk can and in connection with the lid thereof, for facilitating the operation of straining milk direct into a can.

Another object of the invention is to provide a strainer that can be placed in a can and located in engagement with the lid thereof, whereby said strainer and lid can be simultaneously removed from the can.

A further object of the invention is to provide a simple, inexpensive and durable strainer that will permit the milk or cream to be safely strained into a can or similar receptacle.

With the above and other objects in view, which will more readily appear as the invention is better understood, the same consists in the novel construction, combination and arrangement of parts to be presently described and then claimed.

In the drawings, Figure 1 is a vertical sectional view of a can having a funnel shaped neck or mouth equipped with the strainer, Fig. 2 is a plan of the same, and Fig. 3 is a horizontal sectional view taken on the line Y—Y of Fig. 1.

In Figs. 1 to 3 inclusive, I have illustrated a can or receptacle having the neck 2 thereof provided with a funnel shaped mouth 10. Fitted in the neck 2 and the funnel shaped mouth 10 is a funnel 11 having upper reamed edges 12 fitted upon the upper reamed edges of the funnel shaped mouth 10. The lower end of the funnel 11 is provided with a screen 13. The funnel 11 is provided with inwardly projecting diametrically opposed lugs 14, these lugs being located adjacent to the vertical portion 15 of the funnel 11. Adapted to fit in the vertical portion 15 of said funnel is a sleeve 16 of a lid 17, said lid having diametrically opposed outwardly extending lugs 18 adapted to engage under the lugs 14, also the handle 19. The lid facilitates the removal of the strainer, and in either instance, the lid is adapted to maintain the contents of the can or receptacle 1 in a sanitary condition during the interval of pouring milk or cream into the can.

While in the drawings forming a part of this application there is illustrated the preferred form of construction embodying the invention, it is to be understood that the elements therein may be varied or changed without departing from the spirit of the invention.

Having now described my invention what I claim as new, is;—

1. The combination with a can having a neck and a funnel shaped mouth, of a funnel adapted to fit into the mouth and neck of said can, a screen carried by the lower end of said funnel, inwardly projecting oppositely disposed lugs carried by said funnel, a lid fitting in said funnel and having oppositely disposed projecting lugs adapted to engage under the lugs of said funnel for connecting the lid thereto, substantially as described.

2. The combination with a can having a neck and a funnel-shaped mouth, of a funnel adapted to fit into the mouth and neck of said can, a screen attached to the lower end of said funnel, inwardly projecting oppositely disposed lugs formed integral with the funnel at a point intermediate the ends thereof, and a lid fitting in said funnel and provided with means adapted to engage under said lugs for connecting the lid to the funnel.

In testimony whereof I affix my signature in the presence of two witnesses.

HOMER EDNER.

Witnesses:
  J. W. BAILEY,
  S. M. T. BARCLAY.